United States Patent [19]
Mortensen

[11] Patent Number: 5,809,657
[45] Date of Patent: Sep. 22, 1998

[54] POWER SAW BLADE ADAPTOR

[76] Inventor: Frank Mortensen, 14111 Lonewood Pl., Tampa, Fla. 33625

[21] Appl. No.: 844,435

[22] Filed: Apr. 18, 1997

[51] Int. Cl.⁶ .................................................... B27B 11/06
[52] U.S. Cl. .............................................. 30/392; 30/122
[58] Field of Search ............................. 30/392, 393, 394, 30/122, 277.4; 83/750

[56] References Cited

U.S. PATENT DOCUMENTS

| | | | |
|---|---|---|---|
| 3,033,251 | 5/1962 | Atkinson et al. ......................... | 30/392 |
| 3,971,132 | 7/1976 | Griffies et al. ............................ | 30/393 |
| 4,294,013 | 10/1981 | Krieg ......................................... | 30/392 |
| 4,553,306 | 11/1985 | Mineck ..................................... | 30/392 |
| 4,876,793 | 10/1989 | Quaglia ..................................... | 30/122 |
| 5,313,709 | 5/1994 | Pabon-Delgado ........................ | 30/513 |

*Primary Examiner*—Hwei-Siu Payer
*Attorney, Agent, or Firm*—Carlton, Fields

[57] ABSTRACT

The present invention describes an adaptor primarily intended for attaching a door jamb saw blade to a reciprocating tool. The adaptor includes a rigid and generally U-shaped structure having first and second substantially parallel and generally opposed side portions extending from a central base portion, with the first side portion extending a predetermined length from the base portion and having a predetermined thickness and a predetermined width, the second side portion extending a second predetermined length from the base portion and having a substantially planar surface along a side thereof distal from the first side portion, with the distal surface being generally normal to a plane defined by substantially parallel axes extending through the first and second portions.

10 Claims, 2 Drawing Sheets

POWER SAW BLADE ADAPTOR

BACKGROUND OF THE INVENTION

1. Field of the Invention

The present invention relates generally to a saw blade adaptor, and more particularly to a door jamb saw blade adaptor primarily intended for attaching a saw blade to a powered reciprocating tool.

2. Description of the Prior Art

In general, the home improvement industry recently has experienced substantial growth in overall sales. This is particularly true with respect to the installation of various types of flooring, including ceramic or marble tile, hardwood flooring, plastic laminate flooring as well as other types of flooring materials.

Typically, when such flooring materials are installed, the lower portions of door jambs are cut so that the flooring materials may be aligned substantially flush with the bottom of the jamb. One reason for doing this is to enhance the aesthetic appearance around the doors as well as to reduce the tedious cuts that would otherwise need to be made on the flooring material laid around the door jambs.

In order to cut the door jambs to the desired level, hand held door jamb saws have been available for some time. However, such saws are usually inefficient and unduly burdensome on the user, especially in view of the more modern alternative machines that are available. Such conventional approaches may include utilizing circular undercut saws. Significantly, such saws are usually quite expensive and often require removing the door before cutting the jamb. Another alternative technique, disclosed in U.S. Pat. No. 4,876,793, describes attaching a saw blade to a first assembly that is slidably mounted within a guide for lateral movement within the guide, with the guide and the first assembly being attached to a power driven reciprocating saw to cut the door jamb. Unlike the present invention, this is a rather complicated solution to a relatively simple problem. The '793 device includes several By interlocking and movable parts, which may tend to wear and fail over time. Furthermore, the '793 appears to require complex installation, which strongly suggests using a dedicated power reciprocating saw with the '793 assembly.

SUMMARY OF THE INVENTION

A view of this and other prior art readily leads one to the conclusion that there is a need for and economical and efficient way to cut the bottom portion of a door jamb, such as when installing various types of flooring materials. Therefore, it is an object of the present invention to provide a saw blade adaptor to facilitate cutting door jambs to a desired level. It is another object of the present invention to provide an adaptor attachable to most conventional reciprocating saws and to conventional saw blades. Still, another object of the present invention is to provide a saw blade adaptor of simple yet durable construction and that is relatively inexpensive to manufacture. Yet another object of the adaptor of the present invention is to provide a versatile and efficient tool for cutting door jambs and door casings.

To achieve these and other objects that will become apparent, the present invention provides a saw blade adaptor that includes a rigid and generally U-shaped member having a base portion and a pair of generally opposed, substantially parallel and elongated arms extending from opposed sides of the base portion. A first of the elongated arms has a predetermined thickness, a predetermined width and a central longitudinal axis. The second elongated arm has a central longitudinal axis and a generally planar surface distal from the first arm, with the distal surface being substantially parallel to the first arm longitudinal axis and generally normal to a plane defined by the first arm longitudinal axis and the second arm longitudinal axis, and with the distal surface of the second arm extending along a substantial part of the length of the second arm.

BRIEF DESCRIPTION OF THE DRAWINGS

A preferred embodiment of the present invention is illustrated in the drawings in which.

DESCRIPTION OF A PREFERRED EMBODIMENT

Figure 1:
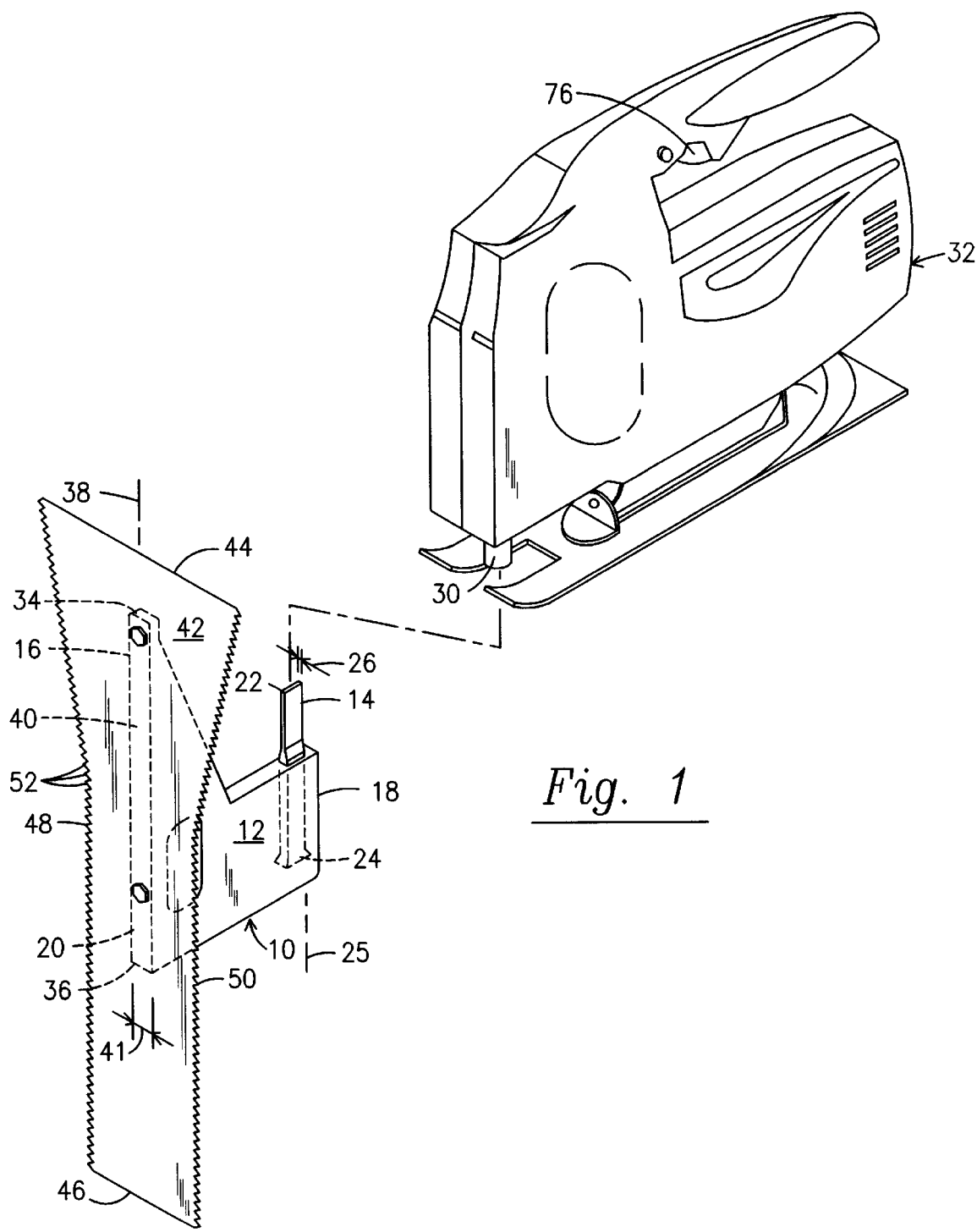
FIG. 1 is an exploded perspective view of a preferred embodiment of an adaptor in accordance with the present invention, which illustrates a typical manner of attachment to a reciprocating saw and a saw blade.

A preferred embodiment of the adaptor of the present invention is illustrated in FIGS. 1–4 as a generally U-shaped member, indicated as reference number 10. The U-shaped structure 10 includes a central base portion 12 and first and second generally opposed, substantially parallel and elongated arms 14 and 16, respectively. Arms 14 and 16, which may be elongated side portions of the U-shaped structure and attached to base 12, extend predetermined lengths from respective, spaced apart opposed ends 18 and 20 of base portion 12.

First elongated arm 14 has a first end 22 and a second end 24 with a central longitudinal axis 25 extending through ends 22 and 24. In addition, first arm 14 has a predetermined thickness 26 and a predetermined width 28, which are dimensioned and configured to define a post attachable to a standard chuck 30 of a conventional reciprocating saw 32, such as a saber saw or other reciprocating tool. For example, where the adaptor 10 of the present invention is to be used with a conventional saber saw 32, a substantially common household tool, at least a portion of first arm 14 distal base portion 12 will define a post that corresponds to the shank of a standard saber saw blade, such that post 14 is easily attachable to and detachable from chuck 30. The dimensions and configuration of arm 14 may vary, of course, depending upon the particular reciprocating tool 32 with which it is intended to be used.

Figure 2:
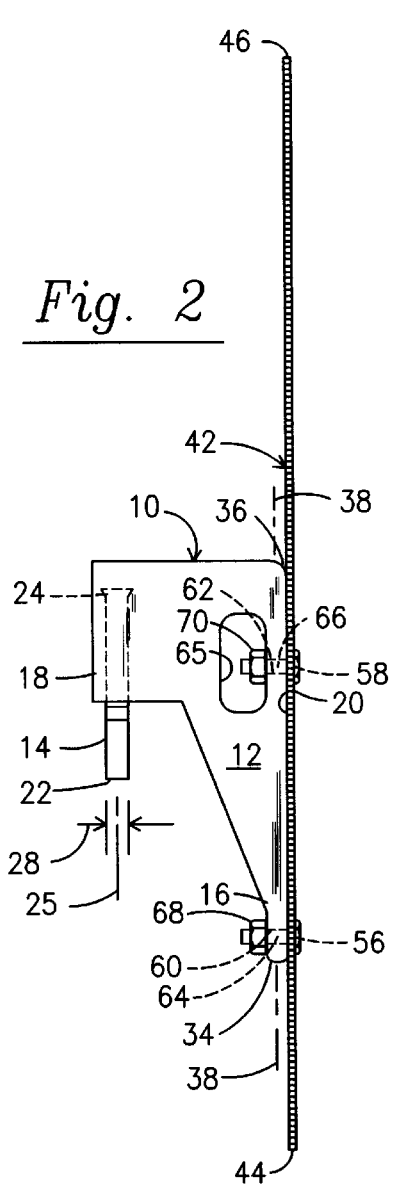
FIG. 2 is a side elevation of the adaptor of FIG. 1 attached to a saw blade.
Figure 3:
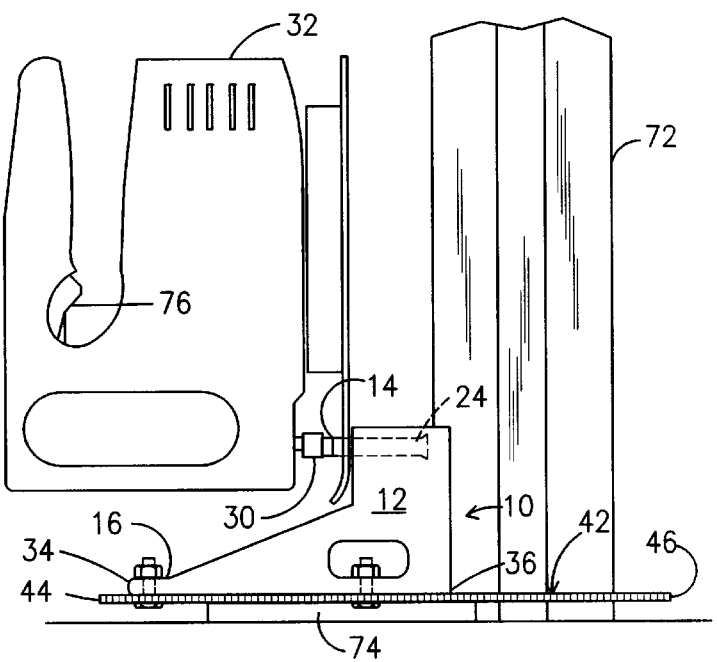
FIG. 3 is a side elevation of the adaptor of FIG. 1, illustrating a preferred method for cutting a door jamb.

As shown in the preferred embodiment of FIGS. 1–3, base portion 12 and arm 14 may be formed of distinct structures of the same or different materials, with a portion of first arm second end 24 being rigidly affixed to base first end 18 during the manufacture process, such as by welding, applying an adhesive, fusing, using threaded fasteners, riveting, a combination of these methods, as well as other conventional fastening means known in the art.

Preferably, as shown in FIGS. 1–3, end 24 of arm 14 includes a lip or flange around which base 12 may be molded of a rigid material to rigidly secure arm 14 within the adapter. The non-circular sidewalls of arm 14 positioned within base 12, which are shown to be generally flat, also inhibit rotation of arm 14 about axis 25. Alternatively, a portion of arm 14 distal from end 22 may be threaded with a corresponding threaded bore formed in base 12 into which post 14 may be screwed. A conventional pin may be inserted through a portion of base end 20 and through at least a portion of post 14 to inhibit rotation of post 14 about axis 25 as well as to substantially prevent linear movement of post 14 with respect to base 12 along axis 25.

Where arm 14 is secured to base first end 18, base portion 12 may be formed of a substantially rigid material, such as an industrial grade thermoplastic material, steel, cast aluminum or other rigid material, with arm 14 being formed of steel, or other substantially rigid material having sufficient tensile properties to endure the forces that may be exerted upon adaptor 10. In addition, the attachment of arm 14 to base first end 18 should be sufficient to withstand these forces and resist failure.

First arm 14, base 12 and second arm 16 may be integrally formed as a unitary structure of a rigid material, suitably stainless steel. Thus, first arm 14 may be an elongated portion of base first end 18. In addition, first arm 14 may be tempered or otherwise reinforced with respect to base 12 to enable it to withstand the substantial stress that it may experience during use.

Elongated second arm portion 16 includes a first end 34 spaced apart from a second end 36, with a longitudinal central axis 38 extending through first and second ends 34 and 36. Second arm axis 38 may be substantially parallel to first arm axis 25, with second arm portion 16 extending a predetermined length from base end 20. Second arm 16 includes a substantially planar surface formed along its side 40 that is positioned distal from first arm portion 14.

Distal surface 40 is generally normal to a plane defined by first arm longitudinal axis 25 and second arm longitudinal axis 38 as well as being parallel to first arm axis 25. This geometry enables arm 16 and surface 40 to move parallel to axis 25 upon reciprocation of arm 14 along axis 25, such as will occur through its attachment to reciprocating saw 32. Preferably, distal surface 40 has a predetermined width 41 and extends along at least a substantial part, and suitably the entire portion, of the length of second portion 16 between ends 34 and 36. The length and width of distal surface 40 provide a surface area that engages blade 42 when attached thereto. The length of second arm portion 16 will typically be greater than the length of first arm portion 14, with distal surface 40 providing even a greater surface area for engaging blade 42. Advantageously, the surface area 40, through its engagement with blade 42, distributes the forces applied by saw blade 42, which allows base 12 and side portion 16 to be formed of less rigid materials than arm 14, suitably an aluminum or a rigid thermoplastic resin material.

Second arm 16 will typically be formed of the same substantially rigid material as base 12 noted above. Accordingly, arm 16 may be integral with base 12 and be defined by an elongated portion of base second end 20, with ends 34 and 36 defining respective upper and lower ends of the elongated second end portion 20. The terms upper and lower as used in this context refer to an adaptor 10 oriented substantially as shown in FIG. 1, with the elongated arm portions 14 and 16 extending generally upwardly from base portion 12. Arm 16, of course, also may be made of a different rigid material from base 12 and be secured to base 12 by conventional means without departing from the spirit and scope of the present invention.

With the basic structure of a preferred embodiment of the saw blade adaptor having been described above, a preferred manner of its usage may be understood as follows. Saw blade 42 may be a hand held door jamb saw with the handle removed, a saw blade designed specifically for attachment to the adaptor 10 or any other generally elongated saw blade that may be attached to second arm 16. Preferably, saw blade 42 includes a first end 44, a second end 46 and a pair of side edges 48 and 50 extending between first and second ends 44 and 46, with at least one of the side edges 48 or 50 having a plurality of teeth 52. Blade 42 is attached to adaptor 10, with a substantially planar portion of blade 42 engaging the second arm distal surface 40. Blade may be attached to adaptor 10 with a substantial part of its length extending beyond second portion second end 36, as shown in FIGS. 1–3. Blades of substantially any width or shape, such as a blade longitudinally tapering between its side edges 48 and 50 or a generally rectangular blade, among others, may be used in connection with the adaptor 10 of the present invention.

In the preferred embodiment shown in FIGS. 1–3, a pair of spaced apart apertures 56 and 58 are formed through blade 42 generally proximal one of its ends 46. A corresponding pair of spaced apart holes 60 and 62, which may also be slots, are formed through second arm 16, suitably proximal ends 34 and 36, with holes 60 and 62 being dimensioned and configured for alignment with apertures 56 and 58. In order to facilitate the attachment of blade 42 to adaptor 10, an additional aperture 65 may be formed through the sidewall of base 12 proximal to surface 40 and proximal to end 36. Aperture 65 should be dimensioned such that a conventional nut may be received therein without compromising the integrity of the adaptor structure. In addition, slot 62 is formed through surface 40 to intersect aperture 65. Accordingly, blade 42 may be attached to arm 16 by aligning apertures 56 and 58 with holes 60 and 62 and then inserting threaded elongated fasteners 64 and 66, which may be bolts, screws or other conventional fasteners, through their respective pair of holes 60 and 62 and then tightening the engagement between distal surface 40 and blade 42 by threading appropriate nuts 68 and 70, suitably hex or wing nuts, onto their respective fasteners 64 and 66, with nut 70 positioned within hole 65 threading onto fastener 66. While such a nut and bolt fastener has been described, it will be understood by those skilled in the art that blade 42 may be attached to adaptor 10 by other means including, without limitation, clamping, welding, fusing, riveting, gluing, as well as other conventional mounting methods.

With the blade 42 attached to second arm 16, a portion of first arm 14 proximal to end 22 may conveniently be inserted into and be retained by the chuck 30 of reciprocating tool 32. While a conventional saber saw is illustrated in FIGS. 1 and 3, other reciprocating tools known in the art may also be used in connection with the adaptor of the present invention.

Figure 4:
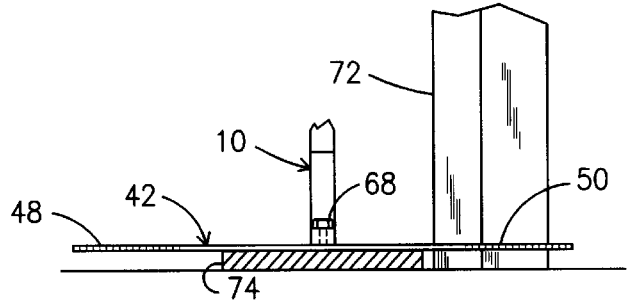
FIG. 4 is a fragmentary end view of the adaptor of FIG. 3, which illustrates cutting a door jamb.

Referring to FIGS. 3 and 4, preferred embodiments of the adaptor 10 of the present invention are shown in combination with blade 42 and saw 32 cutting a door jamb 72. In order to position blade 42 at a desired cutting level, a piece of the flooring material 74 that is to be installed under the jamb, suitably a tile or a portion thereof, may simply be positioned flat on the floor adjacent door jamb 72, with the lower surface of blade 42 resting upon the flooring material 74. Saw 32 may then conveniently be engaged, such as by depressing lever 76, to cause chuck 30 and first arm 14 to reciprocate along axis 25, thereby causing surface 40 and blade 42 to reciprocate parallel to axis 38. Then, by moving blade 42 parallel to the flooring 74 and towards the door jamb 72, the jamb 72 may be undercut effectively and efficiently to the level of the flooring material that is to be installed. Obviously, the user will manipulate blade 42 towards door jamb 72 in an ordinary manner to cut the entire door jamb. Once completed, the lower cut piece of the door jamb may simply be removed and the flooring may then be installed in a conventional manner, fitting snugly under door jamb 72.

After the user has cut the door jambs to the appropriate level, the adaptor 10 of the present invention may easily be removed from reciprocating tool 32, thereby freeing the tool for other home improvement or industrial tasks. Likewise, blade 42 may also be removed from adaptor 10, and blade 42 and adaptor 10 may conveniently then be placed in an appropriate tool storage area.

While the foregoing describes particularly preferred embodiments of the apparatus of this invention, it is to be understood that this description and the illustrations are indicative only of the principles of this invention and are not to be considered limitative thereof. Accordingly, because numerous variations and modifications of the invention, all within the scope of the invention will readily occur to those skilled in the art, the scope of the invention is to be limited solely by the claims appended hereto.

What is claimed:

1. A door jamb saw blade and adaptor, in combination, for attaching such saw blade to a reciprocating tool, said combination comprising:

a unitary, U-shaped structure formed of a substantially rigid material having first and second substantially parallel and generally opposed side portions extending from opposing ends of a central base portion, said first side portion having a first end and a second end, with a longitudinal axis extending through said first end and said second end of said first side portion, said first side portion extending a first predetermined length from one of said base portion ends and having a predetermined thickness and a predetermined width, said second side portion having a first end and a second end, with a longitudinal axis extending through said first end and said second end of said second side portion, said second side portion longitudinal axis being substantially parallel to said first side portion longitudinal axis, with said second side portion extending a second predetermined length, greater than said first predetermined length, from the other of said base portion ends and having a substantially planar surface along a side of said second side portion distal said first side portion, said second side portion distal surface being generally normal to a plane defined by said first side portion longitudinal axis and said second side portion longitudinal axis, with said second a portion distal surface having a predetermined width and extending along at least a substantial part of said length of said second side portion; and a saw blade attached to said second side portion.

2. A door jamb saw blade and adaptor combination as in claim 1 further comprising:

said saw blade having a pair of elongated, spaced apart side edges and at least one substantially planar surface extending between said pair of side edges, with at least one of said side edges having a plurality of teeth, said blade attached to said adaptor, with said one planar surface engaging said second side portion distal surface.

3. A door jamb saw blade and blade adaptor in combination, comprising:

a rigid and generally U-shaped member having a base portion and a pair of generally opposed, substantially parallel and elongated arms extending from opposed ends of said base portion, a first of said elongated arms having a predetermined thickness, a predetermined width, a central longitudinal axis, and a post dimensioned and configured for attachment to a reciprocating tool assembly, and a second of said elongated arms having a central longitudinal axis and a generally planar surface distal said first arm, said second arm distal surface being substantially parallel to said first arm axis and generally normal to a plane defined by said first arm axis and said second arm axis, said second arm distal surface extending from a position proximal an end of said second arm to a position along said second arm distal said end of said second arm; and a saw blade attached to said member.

4. A door jamb saw blade and adaptor combination as in claim 3, further comprising:

said saw blade having a first end, a second end, and a pair of side edges extending between said first end and said second end, at least one of said side edges having a plurality of teeth, said blade attached to said adaptor, with a portion of said blade engaging said second arm distal surface.

5. An combination as in claim 4 further comprising a fastener attaching said blade to said second arm.

6. An combination as in claim 4 wherein said second arm distal surface comprises a slot formed therethrough intermediate said end of second arm and said base portion;

said blade further comprises an aperture formed therethrough dimensioned and configured according to said second arm slot, said blade aperture being aligned substantially with said second arm slot; and said fastener comprises an elongated member extending through said slot and said aperture for attaching said blade and said second arm.

7. A saw blade adaptor for attaching a saw blade to a reciprocating tool, said adaptor comprising:

an elongated arm having a first end, a second end and a longitudinal axis extending through said first end and said second end, said elongated arm having a predetermined width and a predetermined thickness; and a base having a first end portion and an elongated second end portion spaced a predetermined distance apart from said base first end portion, a portion of said elongated arm proximal said elongated arm second end being rigidly affixed to said base first end portion, with a substantial part of said elongated arm extending a first predetermined length from said base first end portion, said elongated second end portion having an upper end and a lower end, with said elongated second end portion being spaced a predetermined distance apart from and in a generally opposed relation to said elongated arm, said elongated second end portion having a longitudinal axis extending through said upper and lower ends of said elongated second end portion, said elongated second end portion longitudinal axis being substantially parallel to said elongated arm longitudinal axis, and said elongated second end portion having a substantially planar surface positioned distal from said elongated arm, said planar surface being substantially normal to a plane defined by said elongated arm longitudinal axis and said elongated second end portion longitudinal axis and being substantially parallel to said elongated arm longitudinal axis, said planar surface having a predetermined width and a predetermined length, said length of said planar surface being greater than said length of said elongated arm.

8. An adaptor as claimed in claim 7 wherein said arm second end comprises a flange, with a portion of said base proximal to said base first end portion surrounding a portion of said arm distal said arm first end portion.

9. An adaptor as claimed in claim 8 wherein said portion of said base proximal to said base first end portion surrounds said flange.

10. An adaptor as claimed in claim 7 wherein said base further comprises a sidewall portion extending between said base first end portion and said base second end portion, with an aperture formed through said base sidewall portion proximal to said base second end portion and to said planar surface.

* * * * *

UNITED STATES PATENT AND TRADEMARK OFFICE
CERTIFICATE OF CORRECTION

PATENT NO. : 5,809,657
DATED : September 22, 1998
INVENTOR(S) : Mortensen, Frank It is certified that error appears in the above-indentified patent and that said Letters Patent is hereby corrected as shown below:

In claim 1, column 5, line 53 change "second a portion" to --second side portion--.

In claim 5, column 6, line 32 change "An" to --A--.

In claim 6, column 6, line 34 change "An combination as in claim 4 wherein" to --A combination as in claim 5 wherein--.

Signed and Sealed this

Sixteenth Day of February, 1999

Attest:

Attesting Officer

Acting Commissioner of Patents and Trademarks